United States Patent [19]

Tarpinian et al.

[11] E Re. 28,775

[45] Reissued Apr. 20, 1976

[54] HARMONIC SIGNAL ANALYZER SYSTEM FOR TESTING TIRES

[75] Inventors: Haig D. Tarpinian, Grosse Pointe, Mich.; Harry Friedmann, Barrington, R.I.

[73] Assignee: Uniroyal Inc., New York, N.Y.

[22] Filed: Mar. 1, 1971

[21] Appl. No.: 119,970

Related U.S. Patent Documents

Reissue of:

[64] Patent No.: 3,479,867
Issued: Nov. 25, 1969
Appl. No.: 644,965
Filed: June 9, 1967

[52] U.S. Cl. ..... 73/146

[51] Int. Cl.[2] ..... G01M 17/02; B60C 19/10

[58] Field of Search ..... 73/146, 457, 458, 459, 73/460, 462, 463, 464, 465, 467, 73/468, 469, 470–479

[56] References Cited

UNITED STATES PATENTS

| | | | |
|---|---|---|---|
| 2,155,528 | 4/1939 | Cadden | 73/474 |
| 2,712,232 | 7/1955 | Pfeiffer | 328/1 X |
| 2,839,915 | 6/1958 | Roth et al. | 73/59 |
| 3,051,933 | 8/1962 | Cressey et al. | 307/308 X |
| 3,412,615 | 11/1968 | Nedley | 73/146 X |
| 3,452,603 | 7/1969 | Kaiser et al. | 73/466 |

FOREIGN PATENTS OR APPLICATIONS

| | | | |
|---|---|---|---|
| 250,062 | 10/1966 | Austria | 73/462 |
| 401,533 | 5/1966 | Switzerland | 73/462 |

*Primary Examiner*—James J. Gill
*Attorney, Agent, or Firm*—Charles A. Blank

[57] ABSTRACT

An electronic, undamped oscillator driven by a periodic input signal (forcing function) having a frequency equal to the natural frequency of the oscillator develops an output sinusoidal signal having a rate of growth (amplitude increase) proportional to the amplitude of the first harmonic component of the input signal. When the input signal is a force variation signal and the oscillator is tuned to the rotational frequency of a tire mounted on the force variation machine, the rate of growth of the output signal of the oscillator is proportional to the amplitude of the force variation signal. A peak follower detects the amplitude of the increments between successive peaks of the oscillator output signal. A meter indicates the amplitude of the successive peaks of the oscillator output signal, thereby indicating the amplitude of the first harmonic component of the force variation signal. A circuit which senses the positive-slope zero-crossing of the oscillator output signal is utilized to energize a tire-marking unit, thereby indicating the position of the peak of the first harmonic component.

16 Claims, 14 Drawing Figures

INVENTORS
HAIG D. TARPINIAN
HARRY FRIEDMANN
Charles A. Blank
ATTORNEY

INVENTORS
HAIG D. TARPINIAN
HARRY FRIEDMANN

Charles A. Blank
ATTORNEY

INVENTORS
HAIG D. TARPINIAN
HARRY FRIEDMANN

Charles A. Brown
ATTORNEY

INVENTORS
HAIG D. TARPINIAN
HARRY FRIEDMANN

ATTORNEY

INVENTORS
HAIG D. TARPINIAN
HARRY FRIEDMANN
Charles G. Black
ATTORNEY

HARMONIC SIGNAL ANALYZER SYSTEM FOR TESTING TIRES

Matter enclosed in heavy brackets [ ] appears in the original patent but forms no part of this reissue specification; matter printed in italics indicates the additions made by reissue.

This invention relates to apparatus for representing a predetermined harmonic component of a repetitive input control effect and, more particularly, to such apparatus suitable for use in a force variation machine for indicating the amplitude and location of a non-uniformity of a tire rotated thereby.

Force variation apparatus for measuring and indicating structural variations, for example, splices of tires, is commercially available. Such apparatus may include a transducer for converting the mechanical force variation into an electrical signal and an amplifier for increasing the amplitude of that signal, which may then be applied to a strip chart recorder or a wave analyzer. Such prior apparatus has been subject to the disadvantages that the strip chart recorder did not indicate the amplitude of harmonic components of the force variation while the wave analyzer was complex and costly. Moreover, the location of the peak of the non-uniformity was not automatically indicated.

It is an object of this present invention, therefore, to provide a new and improved apparatus for representing a predetermined harmonic component of a repetitive input control effect which avoids one or more of the abovementioned disadvantages of prior such apparatus.

It is another object of the invention to provide a new and improved harmonic component analyzer which is of simple construction and has a high degree of reliability.

It is another object of the invention to provide a new and improved apparatus for indicating the amplitude and location of the first harmonic content of the non-uniformity of an object rotated thereby.

In accordance with the invention, apparatus for representing a predetermined harmonic component of a repetitive input control effect comprises means for supplying a repetitive input control effect comprising a predetermined harmonic component and means responsive to the amplitude of the predetermined harmonic component of the input control effect for developing a second control effect having a rate of change of amplitude representative of the amplitude of the predetermined harmonic component of the input control effect. The apparatus also includes means responsive to the second control effect for deriving therefrom a third control effect representing the difference in the amplitudes of the peaks of selected cycles of the second control effect, thereby representing the amplitude of the predetermined harmonic component of the input control effect.

For a better understanding of the present invention, together with other and further objects thereof, reference is made to the following description, taken in connection with the accompanying drawings, and its scope will be pointed out in the appended claims.

Referring now more particularly to the drawings.

Figure 5:
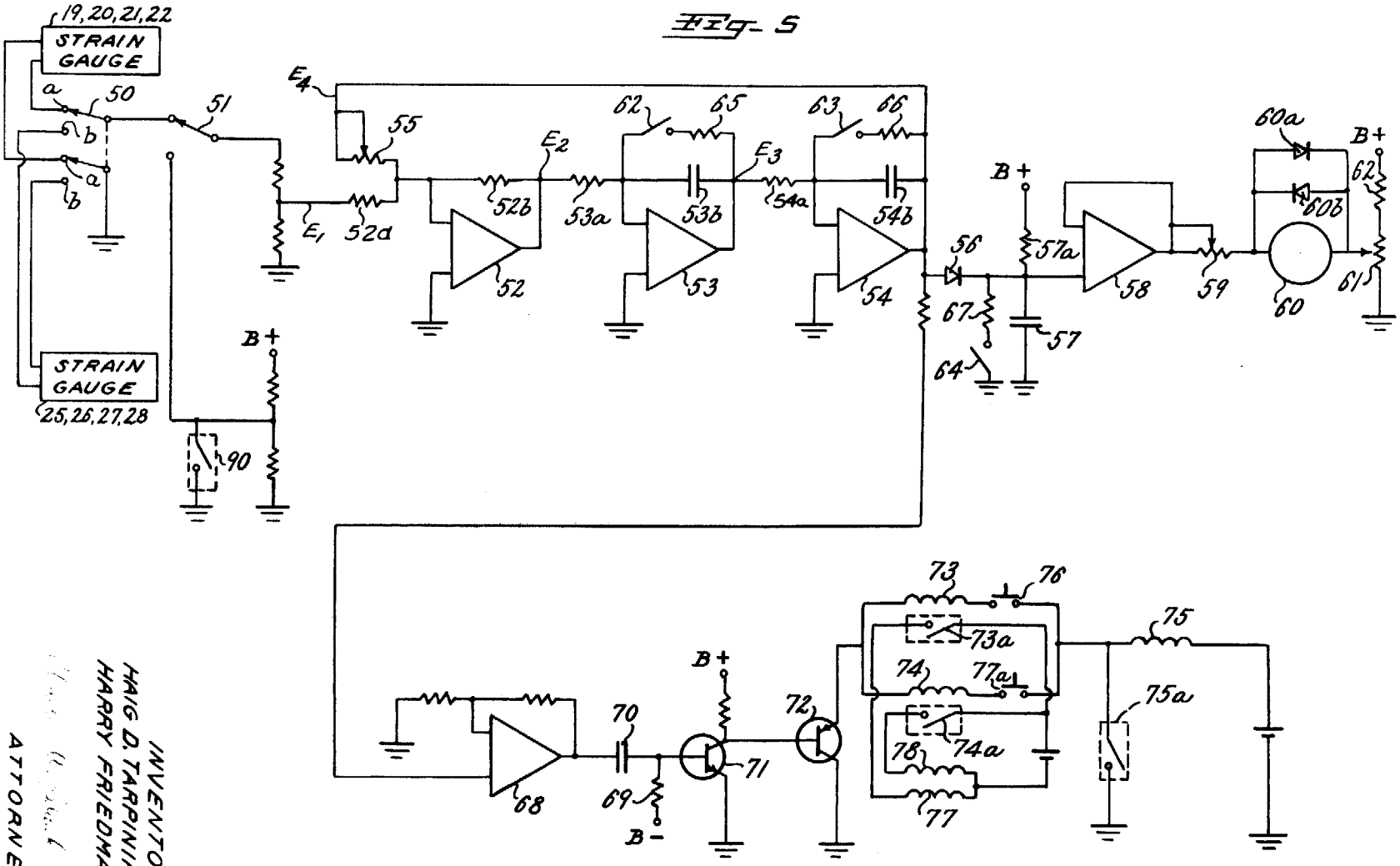
FIG. 5 is a schematic drawing of a harmonic component analyzer constructed in accordance with the invention and suitable for use with the force variation machine of FIG. 1.
Figure 9:
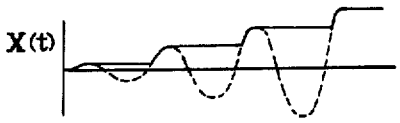
Figure 10:
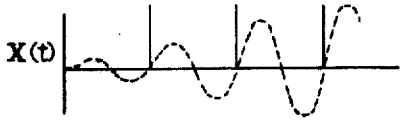
Figure 11:
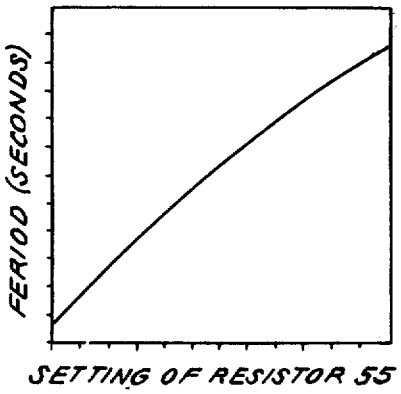

FIGS. 6 to 10, inclusive are graphs representing various electrical signals developed in the FIG. 5 apparatus; and FIG. 11 is a graph representing a frequency calibration chart for a portion of the FIG. 5 apparatus.

Figure 1:
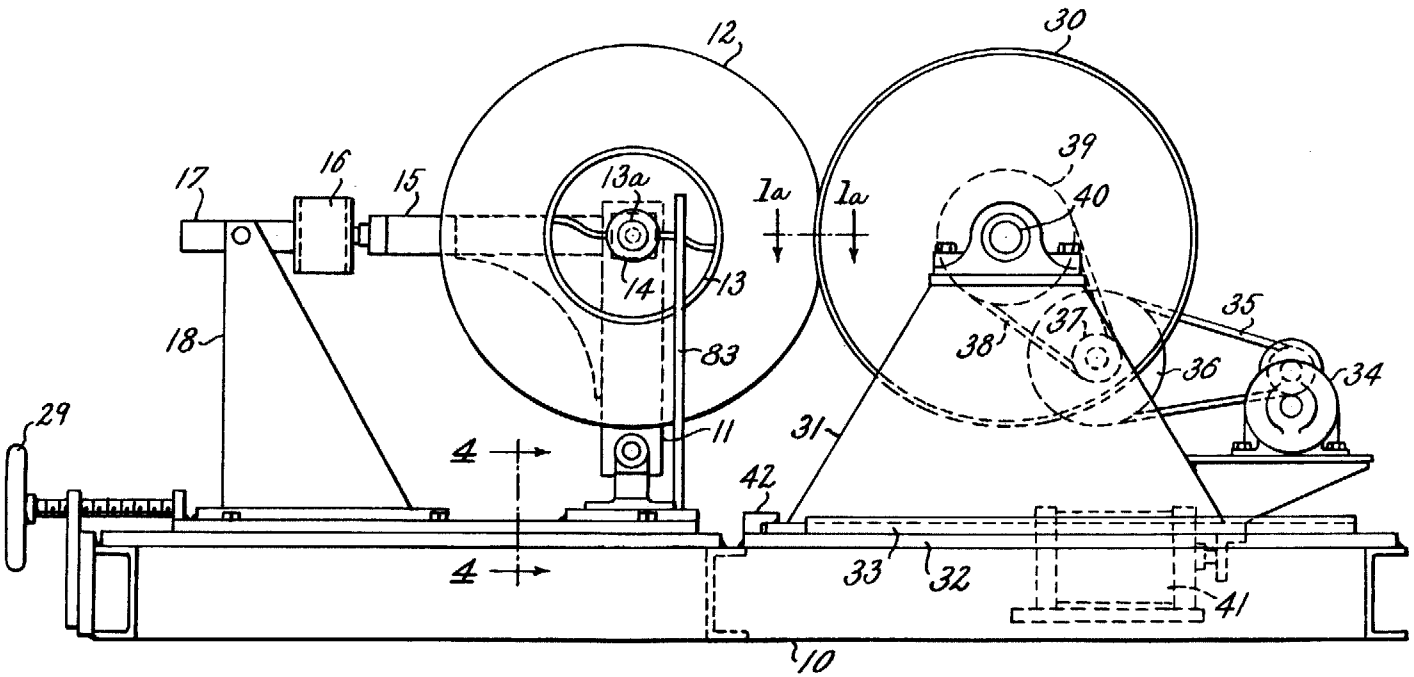
FIG. 1 is an elevational view of force variation apparatus utilizing a harmonic component analyzer constructed in accordance with the invention.
Figure 3:
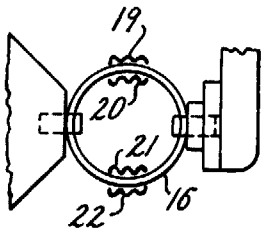
FIG. 3 is a plan view, to an enlarged scale, of a strain gauge cylinder of the FIG. 1 apparatus.
Figure 2:
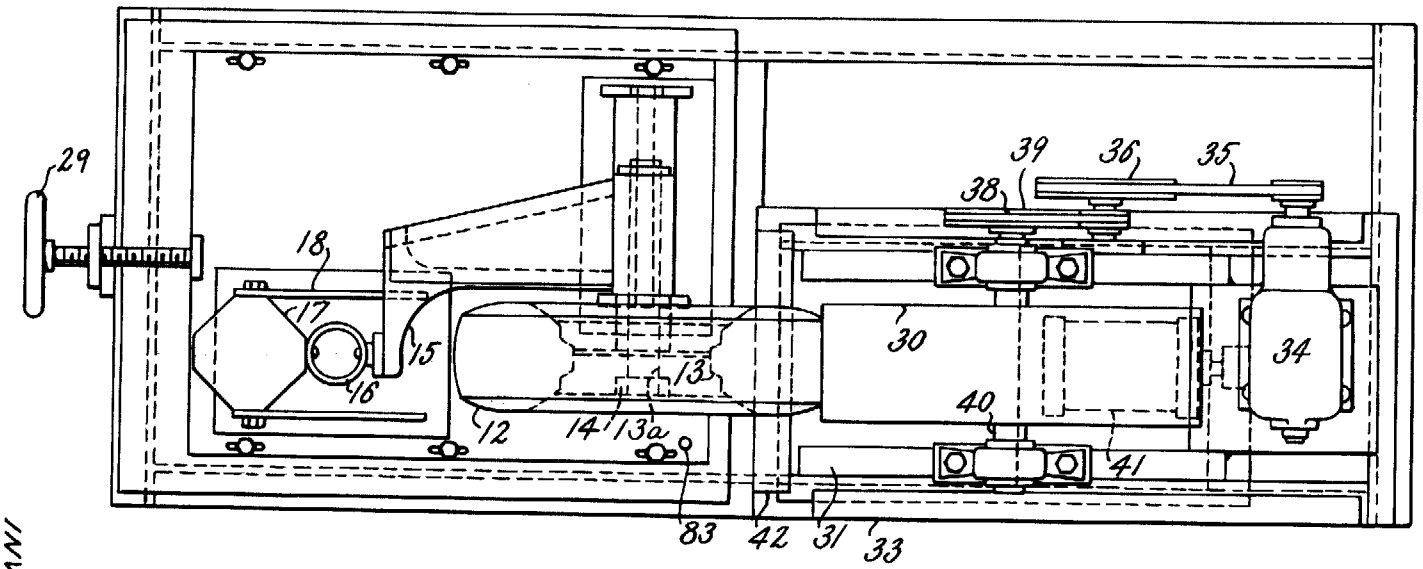
FIG. 2 is a plan view of the FIG. 1 apparatus.

Referring now more particularly to FIGS. 1 and 2, the apparatus there represented is a force variation machine having a base 10 on which there is mounted a tire support 11. A tire 12 is mounted on a rim 13 and is inflated through a rotary coupling 14 on shaft 13a. A support arm 15 extends to a strain gauge cylinder 16 attached to a support 17, 18. The strain gauge utilizes four resistive members 19, 20, 21, 22, represented schematically in FIG. 3 on the cylinder 16. The strain gauge members 19, 20, 21, 22 are connected in a suitable bridge circuit to supply a signal representing deformation of the cylinder 16 under force variation due to radial distortion of the tire.

Figure 4:
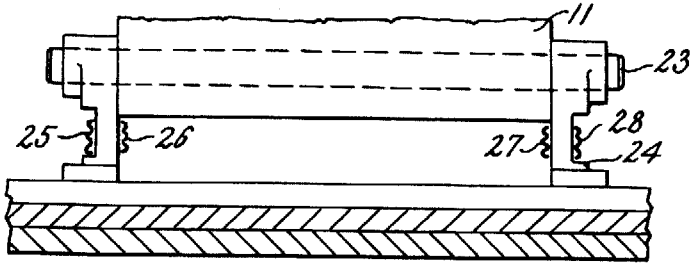
FIG. 4 is an elevational view, to an enlarged scale, of a portion of the tire support of the FIG. 1 apparatus and represents strain gauge members thereof schematically.

As represented in FIG. 4, the tire support 11 is mounted on a pivot shaft 23 and has a flexible base 24 on which there are mounted suitable strain gauge resistive members 25, 26, 27, 28. The strain gauge members 25, 26, 27, 28 are also connected in a suitable bridge circuit to develop a signal representing deformation of the tire support 11 in the direction of the pivot shaft 23 under force variation due to lateral distortion of the tire. The support 18 is adjustably positioned by means of a screw 29 which slides the support 18 along the base plate 10 to determine the amount of deformation applied to the tire 12 by drive wheel 30. The drive wheel 30 is mounted for rotation on a suitable support 31 slidable in guide 33 along the base plate 32. The wheel 30 is driven by a motor 34 coupled by means of suitable belts and pulleys 35, 36, 37, 38, 39 to the rotatable shaft 40 of the wheel 30. A cylinder 41 is utilized to position the wheel support 31 along the base plate 32 against a bar 42, thereby positioning the wheel 30 for rotation of the tire 12.

Referring now to FIG. 5 of the drawings, there is represented apparatus, constructed in accordance with the invention, for representing a predetermining harmonic component of a repetitive input control effect. The apparatus includes means for supplying a repetitive input control effect comprising a predetermined harmonic component, for example, a force-variation signal comprising a first harmonic component. More particularly, this means comprises an input selector switch 50 which may be coupled, for example, in one switch position (a) to the strain gauge members 19, 20, 21, 22 and in the other switch position (b) to the strain gauge members 25, 26, 27, 28. The switch 50 is coupled to a switch 51 for translating the supplied input signal or for selecting a calibration signal, as will be described subsequently.

The apparatus also includes means responsive to the amplitude of the predetermined harmonic component of the input control effect for developing a second control effect having a rate of change of amplitude representative of the amplitude of the predetermined harmonic component of the input control effect. More particularly, this means comprises, for example, a simple, undamped oscillator utilizing operational amplifiers 52, 53, 54 for developing a second signal having a rate of change of amplitude representative of the amplitude of the first harmonic component of the input signal. The oscillator has a feedback circuit including an adjustable resistor 55 for determining the amplitude of the feedback signal and for adjusting the natural frequency of the oscillator to equal the rotational frequency of the tire. The first operational amplifier 52, in conjunction with input resistor 52a, feedback resistor 55 and load resistor 52b, is a summing amplifier. The amplifiers 53 and 54, in conjunction with their associated input resistors 53a, 54a and condensers 53b, 54b, are integrators.

The apparatus also includes circuit means responsive to the second control effect, that is, the output signal of the oscillator, for deriving therefrom a third signal representing the difference in the amplitudes of the peaks of selected cycles of the second control effect, thereby representing the amplitude of the predetermined harmonic component of the input signal. The output circuit of the oscillator is coupled to a peak follower, that is, a peak detector comprising a diode 56 and condenser 57. The condenser 57 is coupled through an operational amplifier 58 and adjustable resistor 59 to a meter 60 having a zero adjustment comprising a potentiometer 61 in series with the resistor 62 and a source of positive voltage B+. The adjustable resistor 59 is a scale adjustment for the meter. The diodes 60a and 60b protect the meter against excessive current surges. A resistor 57a is coupled between the source voltage, B+, and the condenser 57 to supply current flow equal in amplitude to leakage current flow from the condenser 57 through the amplifier 58. The switches 62, 63, 64 are reset switches for discharging the condensers in parallel therewith through the resistors 65, 66, 67 respectively.

Figure 1A:
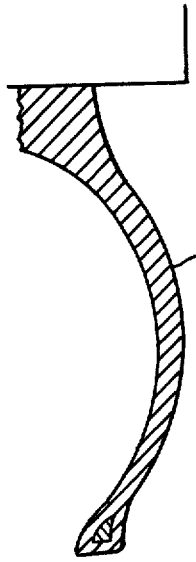
FIG. 1a is a plan view, to an enlarged scale, taken along line 1a—1a of FIG. 1 of a portion of the FIG. 1 apparatus.
Figure 1C:
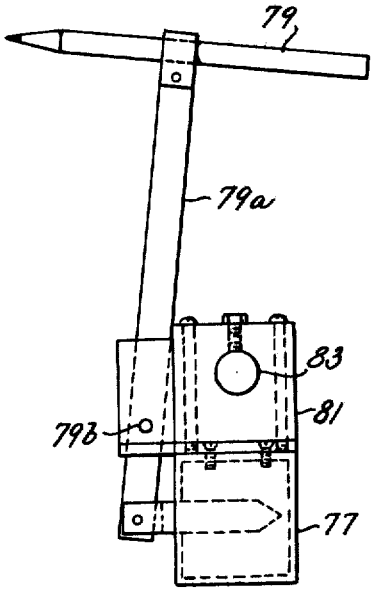
FIG. 1c is a sectional view, to an enlarged scale, of a portion of the FIG. 1 apparatus.
Figure 1C:
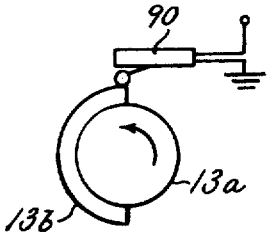
Figure 1B:
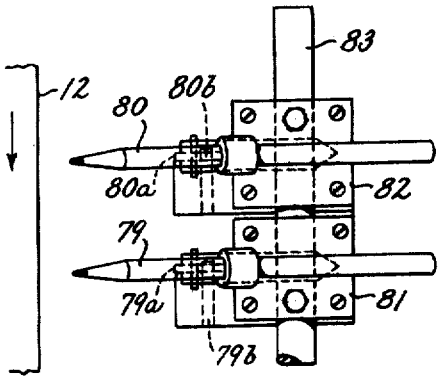
FIG. 1b is an elevational view, to an enlarged scale, of the FIG. 1a apparatus.

The apparatus also includes means responsive to the second control effect for developing pulses occurring with a predetermined phase relation to the predetermined harmonic component of the input control effect. The last-mentioned means comprises, for example, a peak detector including an operational amplifier 68 coupled through a resistor-condenser differentiating network 69, 70 to a transistor switch 71 and transistor amplifier 72. The output circuit of the transistor amplifier 72 is coupled to relays 73, 74 and through switches 76, 77a to a marker solenoid 75. The contacts 73a of the relay 73 complete an energizing circuit for marker solenoid 77 and the contacts 74a of relay 74 complete an energizing circuit for marker solenoid 78 (shown only in FIG. 5). The marker solenoids 77 and 78 control suitable markers 79, 80 (shown only in FIGS. 1a and 1b) of the FIGS. 1 and 2 apparatus for marking the positions of the peaks of the first harmonic components of the force-variation signals representing, respectively, radial and lateral distortions of the tire. As represented in FIGS. 1a and 1b, the markers 79, 80 are, for example, differently colored pencils mounted on spring-loaded arms 79a, 80a pivoted on pins 79b, 80b, respectively, on support blocks 81, 82. The support blocks 81, 82 are adjustably positioned on a vertical support rod 83. The vertical position of the support blocks 81, 82 is so selected that the markers 79, 80 mark the tire substantially at the peaks of the first harmonic components of the radial and lateral distortions, respectively, of the tire. As will become apparent from the following explanation, the markers 79, 80 preferably are positioned to mark the tire substantially at the region of contact of the drive wheel 30 with the tire 12 of FIG. 1 and thus to mark the first harmonic distortion peaks in correspondence with the occurrence times of the pulses of FIG. 10 referred to subsequently.

Referring now more particularly to FIGS. 1 and 2 of the drawings, when the drive wheel 30 rotates the tire 12, force variations as translated along support arm 15 to the strain gauge cylinder 16 and along the tire support 11 to the strain gauge members 25, 26, 27, 28. Non-uniformities in the tire construction cause radial force variations which are translated by the strain gauge members 19, 20, 21, 22 into an electrical signal and lateral force variations, that is, force variations parallel to the axis of the tire, which are translated by strain gauge members 25, 26, 27, 28 into an electrical signal. The rotational frequency of the tire may, for example, be 6 revolutions per minute.

The radial force variation signal may be selected by positioning switch 50 at contacts (a) for application of the radial force variation signal as a forcing function to the oscillator [s] 52, 53, 54.

Figure 6:
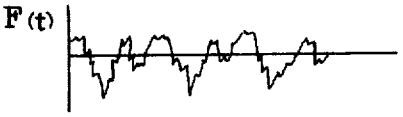
Figure 7:
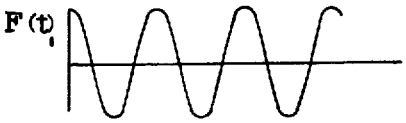
Figure 8:
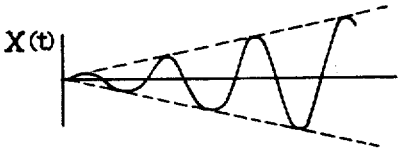

The oscillator is a simple, undamped oscillator which [functions in accordance with the following equation 1:] functions in accordance with the following Equation 1:

$$\ddot{X}(t) + \omega^2 X(t) = kF(t) \qquad (1)$$

where F(t) represents a forcing function, k is a constant, $\omega$ represents the natural (angular) frequency of the oscillator, X(t) represents the output signal of the oscillator, as a function of time (t), and $\ddot{X}(t)$ is the second time derivative of the signal X(t). The natural frequency of the oscillator is adjustable by adjustment of the resistor 55 of FIG. 5, and any forcing function will cause the oscillator to oscillate. However, a special case occurs when the forcing function F(t), for example, as represented in FIG. 6, is periodic and its fundamental frequency is equal to the natural frequency of the oscillator. Such an operating condition is defined as resonance and the output signal X(t) of the oscillator is then a sinusoidal signal of increasing amplitude, as represented in FIG. 8. The rate of increase of the amplitude of the oscillator output signal is proportional to the amplitude of the first harmonic component of the input signal represented in FIG. 7. When the forcing function input signal F(t) is the radial force variation signal, and when the oscillator is tuned to the rotational frequency of the tire, then the rate of increase of the amplitude of the output signal X(t) of the oscillator is proportional to the amplitude of the first harmonic component of the radial force variation signal.

The output signal of the oscillator amplifier 54 is applied through diode 56 to condenser 57. The peak of the first cycle of the output signal of the oscillator amplifier 54 causes the condenser 57 to charge to a voltage representative of the amplitude value of the first peak. The voltage across the condenser 57 is translated by amplifer 58, which has a gain of unity, and the translated voltage is applied through scale-adjusting resistor 59 to the meter 60, which has previously been adjusted to read zero by means of potentiometer 61 when no output signal is developed by the oscillator and when the reset switches 62, 63, 64 are closed.

The operator reads the maximum value indicated by the meter 60 and during the time interval between the first and second peaks of the output signal of the oscillator 54, he readjusts the potentiometer 61 so that the meter reads zero while the condenser 57 is charged to a voltage representing the amplitude value of the first peak of the signal of FIG. 8.

The voltage across condenser 57 is represented by the curve of FIG. 9. When the second peak of the output signal of the oscillator 54 exceeds the amplitude value of the first peak, the condenser 57 charges to the amplitude value of the second peak as indicated in FIG. 9. The voltage across the condenser 57 is translated by the amplifier 58, the output voltage of which is applied to resistor 59 and the meter 60. The value indicated by the meter 60 represents the difference in amplitude between the first and second peaks of the output signal of the oscillator. As mentioned previously, this difference in amplitude is proportional to the amplitude of the first harmonic component of the input signal F(t) applied to switch 50.

The output signal of the amplifier 54 is also applied to saturable amplifier 68. The amplifier 68 saturates to either voltage B+ or B− as the output signal of the oscillator crosses a zero reference in the negative to positive sense or in the positive to negative sense, respectively. The resistor-condenser network 69, 70 is effective to differentiate the upswings of the output signal of the amplifier 68 and develop positive-going pulses of short duration as the amplifier 68 saturates in the positive sense, as represented in FIG. 10. The negative-going pulses of the resistor-condenser network 69 are ineffective since transistor switch 71 only conducts when positive voltages are applied to its base. The pulses occur once per tire revolution and have a fixed phase relationship to the peaks of the first harmonic component, that is, each pulse occurs at the same time as the peak of the first harmonic component of FIG. 7 which leads the oscillator output signal, represented in broken-line construction in FIG. 10, by 90°.

The pulses represented in FIG. 10 render the transistor switch 71 conductive to develop corresponding negative-going pulses which are applied to the transistor switch 72. The switch 72 energizes the event marker solenoid 75 of a suitable strip chart reorder (not shown) and also the relay 73 upon the occurrence of each pulse when switch 76 is closed manually. When the relay 73 is energized, relay contacts 73a close and the radial marker solenoid 77 is energized to cause the radial marker 79 of FIGS. 1a and 1b to mark the circumference of the tire, thereby indicating the location of the peak of the first harmonic of the radial force variation. The limit switch 75a is actuated by a suitable cam (not shown) on shaft 13a of the FIG. 1 apparatus to close momentarily and energize solenoid 75 once each revolution of the tire to provide a reference mark on the strip [ charter ] *chart* recorder corresponding to a given location on the tire, for example, the serial number.

The operation of the oscillator 52, 53, 54 may be more fully understood by considering the following explanation. The first operational amplifier 52 is a summing amplifier having an output signal $E_2$ represented by the following equation:

$$E_2 = -R_3\left(\frac{E_1}{R_1}+\frac{E_4}{R_2}\right) \tag{2}$$

where $E_1$ is the signal representing force variation applied to the resistor 52a, $E_4$ is the feedback signal from the amplifier 54, $R_1$ is the value of resistor 52a, $R_2$ is the adjusted value of the resistor 55, and $R_3$ is the value of the resistor 52b.

The second operational amplifier 53 is an integrator having its output signal $E_3$ proportional to the integral of the input signal $E_2$ as represented by the following equation:

$$E_3 = \frac{-1}{RC}\int E_2 dt \tag{3}$$

where resistor R is the value of resistor 53a and C is the value of condenser 53b.

The amplifier 54 is also an integrator. Its output signal is represented by the following equation:

$$E_4 = \frac{-1}{RC}\int E_3 dt \tag{4}$$

where R is the value of resistor 54a and C is the value of the condenser 54b. Substituting Equation 3 into Equation 4 results in the following equation:

$$E_4 = \left(\frac{1}{RC}\right)^2 \int\int E_2 dt dt \tag{5}$$

By differentiating Equation 5 twice, Equation 6 is derived as follows:

$$\ddot{E}_4 = \left(\frac{1}{RC}\right)^2 E_2 \tag{6}$$

where $\ddot{E}_4$ is the second time derivative of voltage $E_4$.

Substituting the value of $E_2$ from Equation 2 into Equation 6, the following Equation 7 is derived:

$$\ddot{E}_4 + \left[\frac{R_3}{R_2}\left(\frac{1}{RC}\right)^2\right] E4 = -\left[\frac{R_3}{R_1}\left(\frac{1}{RC}\right)^2\right] E_1 \tag{7}$$

Equation 7 is analogous to the differential Equation 1 of an undamped oscillator where $$\omega^2 = \left[\frac{R_3}{R_2}\left(\frac{1}{RC}\right)^2\right],\ k = -\left[\frac{R_3}{R_2}\left(\frac{1}{RC}\right)^2\right],\ \text{and } E_1 = F(t)$$

The reponse of a simple, undamped oscillator, having a natural frequency $\omega$ to an arbitrary periodic forcing function, having the same bse frequency $\omega$ may be expressed mathematically as the sum of an infinite series of terms. Only one of these terms is proportional to time, and this term also is proportional to the amplitude of the first harmonic component of the forcing function. This is established by the analysis which follows:

Equation 1 may be solved for X(t) by means of Laplace transforms. To do this, the Laplacian of each term is taken, and a new equation consisting of the transformed terms is obtained. Assuming a quiescent system, that is, $X(0)=0$ and the first time derivative $\dot{X}(0)=0$, the result is:

$$L\{X(t)\}=g(s),\ L\{\ddot{X}(t)\}=s^2g(s) \text{ and } L\{F(t)\}=f(s)$$

Thus, the differential equation becomes transformed to an algebraic equation as follows:

$$s^2g(s)+\omega^2g(s)=f(s) \tag{8}$$

or $$(s^2+\omega^2)g(s)=f(s) \tag{9}$$

and $$g(s)=f(s)\left(\frac{1}{s^2+\omega^2}\right)=\frac{1}{\omega}f(s)\left(\frac{\omega}{s^2+\omega^2}\right) \tag{10}$$

The inverse transform of Equation 10 is obtained by application of the convolution theorem of the Laplace transform, thereby, producing the solution to the original differential Equation 1 as follows:

$$X(t)=\left[\frac{1}{\omega}L-1\left\{f(s)\right\}\right]^*\left[L-1\left\{\frac{\omega}{s^2+\omega^2}\right\}\right] \tag{11}$$

or, finally $$X(t)=\frac{1}{\omega}\int_0^t F(\tau)\sin\omega(t-\tau)d\tau \tag{12}$$

where $\tau$ is a variable of integration which occurs in the definition of the convolution integral, the variable being integrated over the interval from 0 to t.

It was earlier stated that the function F(t) is a periodic function of natural frequency $\omega$. Thus, it may be expressed by the Fourier series expansion:

$$F(t)=\frac{A_0}{2}+C_1\cos(\omega t+\alpha_1)+\sum_{n=2}^{\infty}C_n\cos(n\omega t+\alpha_n) \tag{13}$$

where $A_0/2$ is the amplitude of the zero frequency component of the function F(t), $C_1$ is the amplitude of the first harmonic component, $\omega$ is the angular frequency of the first harmonic component, $\alpha$, is the phase angle of the first harmonic component, $C_n$ is the amplitude of the harmonic component n, and $\alpha_n$ is the phase angle of the harmonic component n. When Equation 13 is substituted for F(r) in Equation 12, the oscillator response X(t) becomes:

$$X(t)=\frac{A_0}{2}\int_0^t\sin\omega(t-\tau)d\tau+\frac{C_1}{\omega}\int_0^t\cos(\omega\tau+\alpha_1)\sin\omega(t-\tau)d\tau+\sum_{n=2}^{\infty}\frac{C_n}{\omega}\int_0^t\cos(m\omega\tau+\alpha_n)\sin(t-\tau)d\tau \tag{14}$$

When the Equation 14 above is integrated, the solution for the oscillator response X(t) becomes:

$$X(t)=\frac{A_0}{2\omega^2}(1-\cos\omega t)+\underline{\frac{C_1}{2\omega}\left[t\sin(\omega t+\alpha_1)\right.}+\left.\frac{\cos(\omega t+\alpha_1)}{2\omega}-\frac{\cos(\omega t-\alpha_1)}{2\omega}\right]+\sum_{n=2}^{\infty}\frac{C_n}{2\omega^2}\left\{\frac{2}{1-n}\cos(n\omega+\alpha n)-\frac{\cos(\omega t+\alpha_n)}{n-1}+\frac{\cos(\omega t-\alpha_n)}{n+1}\right\} \tag{15}$$

Clearly, the only term which is multiplied by time t is the underlined quantity of Equation 15. It can readily be seen that this term is also proprotional to $C_1$, the amplitude of the first harmonic component of the forcing function F(t). When $(\omega t+\alpha 1)=\pi/2, 5\pi/2, 9\pi/2$, etc., X(t) will equal $C_1t/2\omega$ plus some constant term made up of the sum of the remaining terms, all of which have the same value each period. Thus, the oscillator response X(t) increases with time, but the increments are due only to $C_1/2\omega$. When the incremental change in X(t) from one period to the next is measured by means of a peak follower, a signal representing the value $C_1/2\omega$ is obtained. It should be noted here that the voltage $E_s$ of Equation 7 corresponds to the oscillator response X(t).

Both the frequency of the oscillator 52, 53, 54 and the scale adjustment of the meter 60 must be calibrated before using the analyzer and also every time that the tire size is changed. The driving wheel 30 of the FIG. 1 force variation apparatus rotates at a predetermined frequency. Accordingly, tires of different sizes will have different rotational frequencies because of their different circumferences. Thus, the force variation waves generated by different size tires will have different fundamental frequencies. In order to equalize the natural frequency of the oscillator 52, 53, 54 and the rotational frequency of the tire, the adjustable resistor 55 should be adjusted in accordance with a calibration chart, such as represented in FIG. 11, which has been previously determined. The frequency of the oscillator 52, 53, 54 may be set by measuring the time required for ten revolutions of the tire and dividing this period of time by 10 to obtain the period of one revolution. Referring to the calibration chart of FIG. 11, the appropriate setting of the adjustable resistor 55 may then be determined.

In order to calibrate the scale adjustment setting of resistor 59, the switch 51 of FIG. 5 is switched to connect with the limit switch 90. The limit switch 90 is actuated by sleeve cam 13b on shaft 13a, as represented in FIG. 1c. This actuation of limit switch 90 generates a rectangular wave signal having a frequency equal to the frequency of rotation of the shaft 13a. The peak-to-peak amplitude of the first harmonic component of the calibrator signal is, for example, 18.5 pounds.

The reset switches 62, 63, 64 may then be closed. The potentiometer 62 should then be adjusted to cause the meter 60 to indicate zero. The reset switches 62, 63, 64 should then be opened and the meter will indicate a value corresponding to the first peak of the output signal of the oscillator 52, 53, 54. The potentiometer 61 should then again be adjusted until the meter 60 reads zero. When the meter thereafter reads a new value, this corresponds to the increment between the first and second peaks of the oscillator output signal. The resistor 59 should then be adjusted to read the peak-to-peak value of the calibrator signal, namely, 18.5 pounds. Thereafter, during an operating cycle of the apparatus of FIG. 1, the output signal of the peak follower 56, 57 representing the incremental change $C_1/2\omega$ of the oscillator signal causes a meter reading directly in pounds of first harmonic force variation corresponding to the value of $C_1$, due to the amplification factors introduced by the amplifier 58 and the meter calibration.

It should also be understood that if it is desired to read the amplitude of the second harmonic or higher order harmonic component of the force variation input signal to the FIG. 5 harmonic analyzer, the frequency of the oscillator 52, 53, 54 may be adjusted to equal the frequency of the second harmonic or higher order harmonic component. Suitable calibration of meter scale may be made at the selected harmonic frequency.

The harmonic analyzer of FIG. 5 may also be readily adapted for use in a radial run-out machine in which the input transducer to the harmonic analyzer would supply a signal representing the radial and lateral run-out of a rotating tire.

While there has been described what is at present considered to be a preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for representing a predetermined harmonic component of a repetitive input control effect comprising:

means for supplying a repetitive input control effect comprising a predetermined harmonic component;

means responsive to the amplitude of said predetermined harmonic component of said input control effect for developing a second control effect having a rate of change of amplitude representative of the amplitude of said predetermined harmonic component of said input control effect;

and means responsive to said second control effect for deriving therefrom a third control effect representing the difference in the amplitudes of the peaks of selected cycles of said second control effect, thereby representing the amplitude of said predetermined harmonic component of said input control effect.

2. Apparatus in accordance with claim 1 which includes means responsive to said second control effect for deriving therefrom a fourth control effect representative of the phase of said predetermined harmonic component of said input control effect.

3. Apparatus for representing a predetermined harmonic component of a repetitive input signal comprising:

circuit means for supplying a repetitive input signal comprising a predetermined harmonic component;

circuit means responsive to the amplitude of said predetermined harmonic component of said input signal for developing a second signal having a rate of change of amplitude representative of the amplitude of said predetermined harmonic component of said input signal;

and circuit means responsive to said second signal for deriving therefrom a third signal representing the difference in the amplitudes of the peaks of selected cycles of said second signal, thereby representing the amplitude of said predetermined harmonic component of said input signal.

4. Apparatus for representing the first harmonic component of a repetitive input control effect comprising:

means for supplying a repetitive input control effect comprising a first harmonic component;

means responsive to the amplitude of said first harmonic component of said input control effect for developing a second control effect having a rate of change of amplitude representative of the amplitude of said first harmonic component of said input control effect;

and means responsive to said second control effect for deriving therefrom a third control effect representing the difference in the amplitudes of the peaks of selected cycles of said second control effect, thereby representing the amplitude of said first harmonic component of said input control effect.

5. Apparatus in accordance with claim 4 in which said means responsive to the amplitude of said first harmonic component comprises oscillator means resonant at the frequency of said first harmonic component.

6. Apparatus in accordance with claim 3 in which said circuit means responsive to said second signal comprises peak detector means for developing a third signal representative of the difference in the amplitudes of the peaks of successive cycles of said second signal.

7. Apparatus in accordance with claim 1 which includes means responsive to said second control effect for developing pulses occurring with a predetermined phase relation to said predetermined harmonic component of said input control effect.

8. In apparatus for developing a control effect representative of the non-uniformity of an object rotated thereby, the apparatus including means responsive to the rotating object for developing a first control effect having a repetition frequency representative of the frequency of rotation of the object, said first control effect comprising a predetermined harmonic component having an amplitude representative of the magntidue of the non-uniformity of the object, a harmonic analyzer comprising:

means resonant at the frequency of said predetermined harmonic component of said first control effect and responsive to the amplitude of said predetermined harmonic component of said first control effect for developing a second control effect having a rate of change of amplitude representative of the amplitude of said predetermined harmonic component;

and means responsive to said second control effect for deriving therefrom a third control effect representing the difference in the amplitudes of selected cycles of said second control effect, thereby representing the magnitude of the non-uniformity of the object.

9. In apparatus for developing a signal representative of the non-uniformity of a tire rotated thereby, the apparatus including means responsive to the tire during rotation thereof for developing a first signal having a repetition frequency representative of the frequency of rotation of the tire, the first signal comprising a first harmonic component having an amplitude representative of the magnitude of the non-uniformity of the tire and having a phase representative of the phase of the non-uniformity of the tire relative to a reference point, a harmonic analzyer comprising:

oscillator means responsive to the amplitude of said first harmonic component of said first signal and resonant at the frequency of said first harmonic component of said first signal for developing a second signal having a rate of change of amplitude representative of the amplitude of said first harmonic component;

peak detector means responsive to said second signal for deriving therefrom a third signal representative of the difference in the amplitudes of the peaks of successive cycles of said second signal;

and circuit means responsive to said second signal for deriving therefrom a fourth signal representative of the phase of said first harmonic component of said first signal, whereby the non-uniformity of the tire is indicated.

10. Apparatus for developing a control effect representative of the non-uniformity of a rotatable object comprising:

means for rotating an object;

means responsive to the rotating object for developing a first control effect having a repetition frequency representative of the frequency of rotation of the object, said first control effect comprising a predetermined harmonic component having an amplitude representative of the amplitude of a predetermined harmonic component of the non-uniformity of the object and having a phase representative of the non-uniformity of the object relative to a reference point;

means responsive to amplitude of said predetermined harmonic component of said first control effect for developing a second control effect having a rate of change of amplitude representative of the amplitude of said predetermined harmonic component of said first control effect;

means responsive to said second control effect for developing a third control effect representative of the phase of said predetermined harmonic component of said first control effect;

and means responsive to said third control effect for marking the object to indicate the non-uniformity of the object in accordance with the phase of said predetermined harmonic component of said first control effect.

11. Apparatus for developing a signal representative of the non-uniformity of a tire comprising:

support means for rotating a tire;

means responsive to the force variation on said support means during rotation of the tire for developing a first signal having a repetition frequency representative of the frequency of rotation of the tire, said first signal comprising a first harmonic component having an amplitude representative of the amplitude of the first harmonic component of force variation on said support means and having a phase representative of the phase of said first harmonic component of force variation relative to a reference point;

oscillator means responsive to the amplitude of said first harmonic component of said first signal and resonant at the frequency of said first harmonic component of said first signal for developing a second signal having a rate of change of amplitude representative of the amplitude of said first harmonic component of said first signal;

peak detector means responsive to said second signal for developing a third signal representative of the difference in the amplitudes of the peaks of successive cycles of said second signal and thus representative of the amplitude of said first harmonic component of said first signal;

means coupled to said peak detector means for indicating the amplitude of said first harmonic component of force variation;

means responsive to said second signal for developing a fourth signal representative of the phase of said first harmonic component of said first signal;

and means responsive to said fourth signal for marking the tire to indicate the peak of said first harmonic component of force variation.

*12. A tire radial force variation determining apparatus comprising means to support and rotate a pneumatic tire, a rotatable load wheel exerting a radial load thereon, means mounting the load wheel and the tire for relative deflection in response to radial force variations of the tire, means responsive to said deflections to produce an electrical signal representative of said deflections, circuit means to convert said signal to a plurality of pulses each of which represents the location of the maximum of a predetermined harmonic component of the radial force variation of the tire in a single revolution thereof, and means responsive to said pulses to indicate with reference to the circumference of the tire tested the position of the maximum of said predetermined harmonic component of the radial force variation.*

*13. Apparatus for developing a control effect representative of the non-uniformity of a rotatable object comprising:*

*first means for rotating an object;*

*second means responsive to the rotating object for developing an input control effect having a repetition frequency representative of the frequency of rotation of the object, said control effect comprising a predetermined harmonic component having a phase representative of the non-uniformity of the object relative to a reference point;*

*and electronic oscillator circuit means coupled to said second means and adjustably responsive in frequency to the frequency of said predetermined harmonic component of said input control effect for developing a second control effect representative of the phase of said predetermined harmonic component of said input control effect, thereby representing the non-uniformity of the object.*

*14. Apparatus for developing a signal representative of the non-uniformity of a tire comprising:*

*first means for rotating a tire;*

*second means responsive to the rotating tire for developing an input signal having a repetition frequency representative of the frequency of rotation of the tire, said signal comprising a predetermined harmonic component having a phase representative of the non-uniformity of the tire relative to a reference point;*

*and means, including electronic oscillator circuit means coupled to said second means and adjustably responsive in frequency to the frequency of said predetermined harmonic component of said input signal, for developing pulses representative of the phase of said predetermined harmonic component of said signal, thereby representing the non-uniformity of the tire.*

*15. Apparatus in accordance with claim 14 which includes means responsive to said pulses for marking the tire to indicate the non-uniformity thereof.*

*16. Apparatus for developing a signal representative of the non-uniformity of a tire comprising:*

*first means for rotating a tire;*

*second means responsive to the rotating tire for developing a signal having a repetition frequency representative of the frequency of rotation of the tire, said signal comprising an input first harmonic component having a phase representative of the phase of the first harmonic component of the non-uniformity of the tire relative to a reference point;*

*and means, including electronic oscillator circuit means coupled to said second means and adjustable responsive in frequency to the frequency of said first harmonic component of said input signal, for developing pulses representative of the phase of said first harmonic component of said signal, thereby representing the non-uniformity of the tire.*

* * * * *

UNITED STATES PATENT AND TRADEMARK OFFICE

CERTIFICATE OF CORRECTION

PATENT NO. : Re 28,775
DATED : April 20, 1976
INVENTOR(S) : Haig D. Tarpinian and Harry Friedmann It is certified that error appears in the above–identified patent and that said Letters Patent are hereby corrected as shown below:

Column 14, line 8 for "a" (first occurrence) read --an input--.

Column 14, line 10 for "an input" read --a--.

Column 14, line 14 for "adjustable" read --adjustably--.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*